(12) United States Patent
Liu

(10) Patent No.: US 9,602,869 B2
(45) Date of Patent: Mar. 21, 2017

(54) METHOD AND APPARATUS FOR FAST CHANNEL CHANGE

(71) Applicant: HUAWEI TECHNOLOGIES CO., LTD., Shenzhen (CN)

(72) Inventor: Shuying Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 515 days.

(21) Appl. No.: 14/031,556

(22) Filed: Sep. 19, 2013

(65) Prior Publication Data

US 2014/0020040 A1 Jan. 16, 2014

Related U.S. Application Data

(63) Continuation of application No. PCT/CN2012/073783, filed on Apr. 11, 2012.

(30) Foreign Application Priority Data

Aug. 8, 2011 (CN) .......................... 2011 1 0226087

(51) Int. Cl.
H04N 7/173 (2011.01)
H04N 21/438 (2011.01)
(Continued)

(52) U.S. Cl.
CPC ..... H04N 21/4384 (2013.01); H04N 21/2385 (2013.01); H04N 21/2393 (2013.01);
(Continued)

(58) Field of Classification Search
CPC ................................................ H04N 21/4384
(Continued)

(56) References Cited

U.S. PATENT DOCUMENTS

2004/0194134 A1* 9/2004 Gunatilake .............. H04N 5/50
725/38
2007/0044123 A1 2/2007 Zriny et al.
(Continued)

FOREIGN PATENT DOCUMENTS

CN 1917627 A 2/2007
CN 101321254 A 12/2008
(Continued)

OTHER PUBLICATIONS

Korean Office Action issued on Aug. 29, 2014 in corresponding Korean Patent Application No. 10-2013-7022755.
(Continued)

*Primary Examiner* — Dominic D Saltarelli
(74) *Attorney, Agent, or Firm* — Staas & Halsey LLP

(57) ABSTRACT

Embodiments of the present invention provide a method and an apparatus for implementing FCC. The method mainly includes: receiving, by a fast channel change FCC server, a plurality of FCC requests concurrently sent by the same user, and obtaining, rates of a plurality of channels corresponding to the plurality of FCC requests; and when the FCC server determines that the rates of the plurality of channels do not belong to the same rate range, respectively performing channel change processing for the plurality of FCC requests. The embodiments of the present invention may be applied to a scenario in which FCC is concurrently performed corresponding to a large picture and a channel corresponding to a small picture of the same user, and ensure that FCC of the channel corresponding to the large picture and FCC of the channel corresponding to the small picture do not interfere with each other.

12 Claims, 3 Drawing Sheets

11

An FCC server receives a plurality of FCC requests concurrently sent by the same user, and the FCC server obtains rate information of a plurality of channels corresponding to the plurality of FCC requests.

12

When the FCC server determines that rates of the plurality of channels corresponding to the plurality of FCC requests do not belong to the same rate range, the FCC server respectively performs channel change processing for the plurality of FCC requests

(51) Int. Cl.
  *H04N 21/2385* (2011.01)
  *H04N 21/431* (2011.01)
  *H04N 21/61* (2011.01)
  *H04N 21/239* (2011.01)
  *H04N 21/24* (2011.01)
  *H04N 21/258* (2011.01)

(52) U.S. Cl.
  CPC ..... *H04N 21/2404* (2013.01); *H04N 21/2408* (2013.01); *H04N 21/4316* (2013.01); *H04N 21/4383* (2013.01); *H04N 21/6125* (2013.01); *H04N 21/25816* (2013.01)

(58) Field of Classification Search
  USPC ........................................................ 725/116
  See application file for complete search history.

(56) References Cited

U.S. PATENT DOCUMENTS

| | | |
|---|---|---|
| 2007/0107024 A1 | 5/2007 | Versteeg et al. |
| 2007/0195737 A1 | 8/2007 | Walker et al. |
| 2008/0167133 A1* | 7/2008 | White ............... H04N 5/76 463/43 |
| 2008/0307458 A1 | 12/2008 | Kim et al. |
| 2010/0083326 A1 | 4/2010 | Kisel et al. |
| 2010/0088721 A1 | 4/2010 | Hong et al. |
| 2010/0115566 A1 | 5/2010 | Haimi |
| 2011/0072484 A1 | 3/2011 | Horen |
| 2011/0099595 A1 | 4/2011 | Lindquist et al. ............ 725/105 |
| 2011/0109808 A1 | 5/2011 | Li et al. |

FOREIGN PATENT DOCUMENTS

| | | |
|---|---|---|
| CN | 101438520 A | 5/2009 |
| CN | 102113323 A | 6/2011 |
| CN | 102271281 A | 12/2011 |
| EP | 1 521 468 A1 | 4/2005 |
| EP | 1901457 A2 | 3/2008 |
| EP | 2 001 225 A2 | 12/2008 |
| EP | 2 136 555 A1 | 12/2009 |
| KR | 10-2008-0024839 | 3/2008 |
| KR | 10-2011-0052719 | 5/2011 |
| WO | WO 2010/096966 A1 | 9/2010 |

OTHER PUBLICATIONS

International Search Report mailed Jul. 19, 2012 in corresponding International Application No. PCT/CN2012/073783.

H. Schulzrinne et al., "RTP: A Transport Protocol for Real-Time Applications", Network Working Group, Request for Comments: 3550, Obsoletes: 1889, Standards Track, Jul. 2003, pp. 1-111.

J. Rey et al., "RTP Retransmission Payload Format", Network Working Group, Request for Comments: 4588, Standards Track, Jul. 2006, pp. 1-38.

P. Yang et al., "Extensions to RTCP for Rapid Synchronization", Audio/Video Transport, Internet-Draft, Standards Track, Mar. 8, 2009, pp. 1-14.

European Extended Search Report issued Jan. 3, 2014 in corresponding European Patent Application No. 12792432.2.

* cited by examiner

METHOD AND APPARATUS FOR FAST CHANNEL CHANGE

CROSS-REFERENCE TO RELATED APPLICATIONS

This application is a continuation of International Application No. PCT/CN2012/073783, filed on Apr. 11, 2012, which claims priority to Chinese Patent Application No. 201110226087.0, filed on Aug. 8, 2011, both of which are hereby incorporated by reference in their entireties.

TECHNICAL FIELD

Embodiments of the present invention relate to the field of communications technologies, and in particular, to a method and an apparatus for implementing FCC (Fast channel change).

BACKGROUND

In large-scale deployment and application of an IPTV (Internet Protocol TV) service, a problem of a low channel change speed becomes more and more prominent. To improve user experience, an FCC solution is used to accelerate a channel change process in the industry. An FCC server provides an FCC function for all users in its service scope. Different users may at the same time or at different times send FCC requests to the FCC server. When the same user rapidly selects a channel, the user may also send a plurality of FCC requests to the FCC server in a short time.

Picture in picture (Picture-in-Picture, PIP) uses a digital technology to display two programs on the same screen. That is, on a main picture that is being watched normally, one or more compressed sub-pictures are simultaneously inserted so that other channels are monitored when the main picture is watched. Picture in picture places a sub-picture in a main picture, and generally picture in picture is set for 4:3 color TV; picture off picture (Picture-off-Picture, POP) places a sub-picture outside a main picture, and generally picture off picture is set for 16:9 color TV. In a promotion advertisement, picture in picture and picture off picture are also generally called picture in picture.

The inventor discovers that a main picture and a sub-picture of picture in picture and picture off picture are different multicast groups and are sent to a terminal in a form of two separate multicast flows. In a current application, a main picture program has a large picture, a high definition, and a high channel rate, while a sub-picture has a small picture, a low definition, and a channel rate that is obviously lower than the rate of the main picture.

The inventor also notices that, a solution for the same user sending a plurality of FCC requests to an FCC server in a short time in the prior art is as follows: to satisfy that the same user performs consecutive multiple times of fast channel change, when the FCC server, in the case that the previous FCC of the same user is not completed, receives a new FCC request (also called a concurrent FCC request) is received, the FCC server starts a stop mechanism to end the previous FCC process.

SUMMARY

Embodiments of the present invention provide a method and an apparatus for implementing FCC, so as to achieve that FCC of a channel corresponding to a large picture and FCC of a channel corresponding to a small picture of the same user do not interfere with each other.

In one aspect, a method for implementing fast channel change is provided, including:

receiving, by a fast channel change FCC server, a plurality of FCC requests concurrently sent by the same user, and obtaining, by the FCC server, rates of a plurality of channels corresponding to the plurality of FCC requests; and when the FCC server determines that the rates of the plurality of channels corresponding to the plurality of FCC requests do not belong to the same rate range, respectively performing, by the FCC server, channel change processing for the plurality of FCC requests.

In the other aspect, an apparatus for implementing fast channel change FCC is provided, including:

an FCC request receiving module, configured to receive a plurality of FCC requests concurrently sent by the same user;

a channel rate information obtaining module, configured to obtain rate information of a plurality of channels corresponding to the plurality of FCC requests received by the FCC request receiving module; and a channel change processing module, configured to: when it is determined that rates of the plurality of channels obtained by the channel rate information obtaining module do not belong to the same rate range, respectively perform channel change processing for the plurality of FCC requests.

As can be seen from technical solutions provided in the foregoing embodiments of the present invention, in the embodiments of the present invention, when the FCC server determines that the rates of the plurality of channels corresponding to the plurality of FCC requests do not belong to the same rate range, the FCC server respectively performs channel change processing for the plurality of FCC requests. The embodiments of the present invention may be applied to a scenario in which FCC is concurrently performed for a channel corresponding to a large picture and a channel corresponding to a small picture of the same user, and ensure that FCC of the channel corresponding to the large picture and FCC of the channel corresponding to the small picture of the same user do not interfere with each other.

BRIEF DESCRIPTION OF DRAWINGS

To illustrate the technical solutions in the embodiments of the present invention more clearly, the accompanying drawings required for describing the embodiments are briefly described in the following. Apparently, the accompanying drawings in the following description merely show some embodiments of the present invention, and persons of ordinary skill in the art may still derive other drawings from the accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To facilitate the understanding about the embodiments of the present invention, further description is made through several specific embodiments as examples with reference to the accompanying drawings, and each embodiment does not limit the embodiments of the present invention.

During implementation of the present invention, the inventor finds that: When the same user watches picture in picture or picture off picture, large and small pictures may require concurrent FCC in a short time. Because user information in the FCC requests of the large and small pictures is totally the same but channel information corresponding to the FCC requests is different, an FCC server considers that the same user consecutively and rapidly sends the FCC requests. Therefore, the FCC server stops a previous FCC process and starts to provide a service for a new FCC request. In this way, during a switching process of the large and small pictures, interference occurs. Fast and consecutive switching of the large and small pictures in a short time results in abnormal termination of the previous FCC switching process. For example, if a small picture is rapidly switched after a large picture is switched, a previous FCC process of the large picture is interrupted, and a phenomena such as a black screen and a blurry screen occurs, affecting user watching experience; and vice versa.

Embodiment 1

Figure 1:
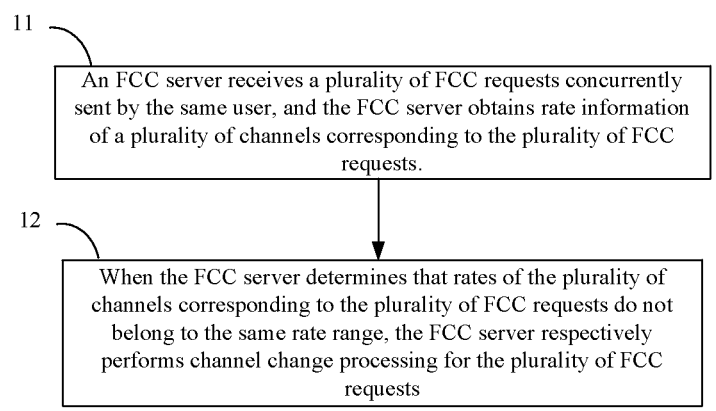
FIG. 1 is a processing flowchart of a method of implementing FCC according to Embodiment 1 of the present invention.

A processing flowchart of a method of implementing FCC provided in this embodiment is shown in FIG. 1, including:

Step 11: An FCC server receives a plurality of FCC requests concurrently sent by the same user, and the FCC server obtains rate information of a plurality of channels corresponding to the plurality of FCC requests.

After an FCC server in an IPTV network concurrently receives a plurality of FCC requests, the FCC server respectively obtains source IP addresses of the plurality of FCC requests. When the source IP (Internet Protocol, Internet protocol, IP) addresses of the plurality of FCC requests are the same, the FCC server determines that the plurality of FCC requests are sent by the same user. The concurrently receiving indicates that an FCC server receives a new FCC request when previous FCC is not completed.

The FCC server, according to preset configuration information or a self-learning manner, obtains rate information of the plurality of channels corresponding to the plurality of FCC requests. A rate is a bit rate of a flow of a channel, and here may be also called "rate value". An FCC server self-learns a rate using the following method: During a process of receiving channel data by the FCC server, the FCC server records the number of packets received by each channel every second and a packet length, according to the recorded number of the packets and packet length, the FCC server calculates the channel rate. The FCC server may further calculate the average value of the obtained rate calculated every second and a previously obtained rate to obtain an accurate channel rate value.

Step 12: When the FCC server determines that rates of the plurality of channels corresponding to the plurality of FCC requests do not belong to the same rate range, the FCC server respectively performs channel change processing for the plurality of FCC requests.

When an IPTV user uses a picture in picture or picture off picture function, because a small picture only has a function of monitoring a channel, and is not a main watched picture, a requirement for data flow information of a channel corresponding to a small picture is low, program coding compression is large, and a rate is obviously smaller than that of a channel corresponding to a large picture.

The embodiment of the present invention sets one or more channel rate thresholds on the FCC server. The channel rate threshold can be adjusted according to an actual situation. Different channel rate thresholds correspond to different channel rate ranges. After the FCC server obtains the rate information of the plurality of channels corresponding to the plurality of FCC requests sent by the same user, the FCC server compares the rate information of the plurality of channels with the foregoing channel rate threshold, and determines whether the rates of the plurality of channels corresponding to the plurality of FCC requests belong to the same rate range.

When the FCC server determines that rates of the plurality of channels corresponding to the plurality of FCC requests do not belong to the same rate range, the FCC server determines that the same user sending the plurality of FCC requests uses the picture in picture or picture off picture function, and the plurality of FCC requests sent by the user are used to respectively request channels corresponding to large and small pictures of picture in picture or picture off picture, the FCC server respectively performs channel change processing such as unicast data flow pushing for the plurality of FCC requests sent by the same user.

When the FCC server determines that rates of the plurality of channels corresponding to the plurality of FCC requests belong to the same rate range, the FCC server determines that the plurality of sent FCC requests are not FCC requests concurrently sent by the user for a channel corresponding to a large picture and a channel corresponding to a small picture, and the FCC server stops processing previously received FCC requests and performs channel change processing such as unicast data flow pushing for the FCC request received last time.

For example, when there is one channel rate threshold, a channel of which the rate is larger than the channel rate threshold is considers as the channel corresponding to a large picture, and a channel of which the rate is smaller than the channel rate threshold is considers as the channel corresponding to a small picture. When the FCC server consecutively and rapidly receives two FCC requests sent by the same user, that is, the FCC server receives a new FCC request in the case that a previous FCC request is not completed; the FCC server compares rate information of two channels corresponding to the two FCC requests with the foregoing channel rate threshold. When the rate of a channel is larger than the foregoing channel rate threshold, the FCC server determines that the channel is a channel corresponding to a large picture. When the rate of a channel is smaller than or equal to the foregoing channel rate threshold, the FCC server determines that the channel is a channel corresponding to a small picture. The FCC server respectively performs channel change processing such as unicast data flow pushing for the foregoing channels corresponding to the large and small pictures.

When the rates of the foregoing two channels are both larger than the foregoing channel rate threshold, the FCC server determines that the foregoing two channels are both channels corresponding to a large picture. When the rates of the foregoing two channels are both smaller than or equal to the foregoing channel rate threshold, the FCC server determines that the foregoing two channels are both channels corresponding to a small picture. The FCC server stops processing an FCC request received the first time, and performs channel change processing such as unicast data flow pushing for an FCC request received the second time.

Of course, the FCC request the first time may be for a channel corresponding to a small picture, and the FCC request the second time may be for a channel corresponding to a large picture.

As can be seen from technical solutions provided in the foregoing embodiment of the present invention, in the embodiment of the present invention, when the FCC server determines that the rates of the plurality of channels corresponding to the plurality of concurrent FCC requests do not belong to the same rate range, the FCC server respectively performs channel change processing for the plurality of FCC requests. The embodiment of the present invention may be applied to a scenario in which FCC is concurrently performed for a channel corresponding to a large picture and a channel corresponding to a small picture of the same user. At this time, even if the FCC server receives a new FCC request in the case that previous FCC is not completed, the FCC server does not need to start a stop mechanism to end the previous FCC process. The embodiment of the present invention ensures that FCC of the channel corresponding to the large picture and FCC of the channel corresponding to the small picture of the same user do not interfere with each other.

Embodiment 2

Figure 2:
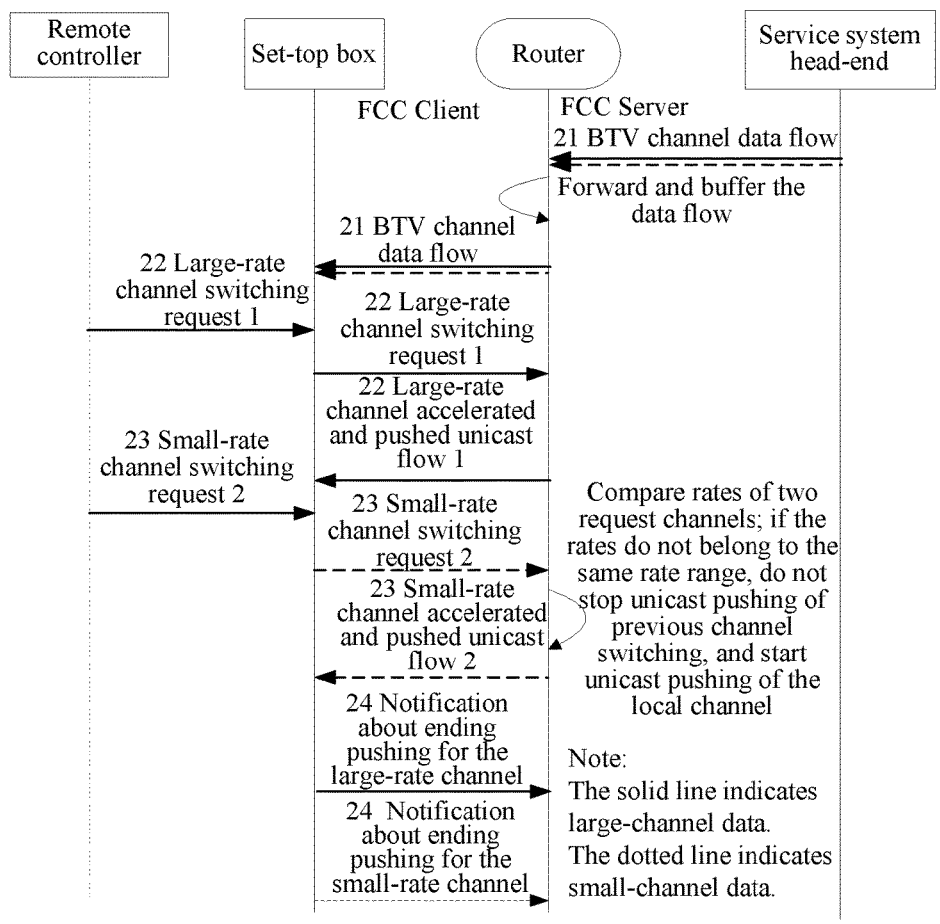
FIG. 2 is a processing flowchart of a method of implementing FCC according to Embodiment 2 of the present invention.

A processing flowchart of a method of implementing FCC provided in this embodiment is shown in FIG. 2, including:

Step 21: A service system head-end sends to a router as an FCC server a data flow of a channel, for example, a BTV channel, and the router buffers the data flow of the foregoing BTV channel, and sends the data flow to an IPTV user through a set-top box.

Step 22: The foregoing user uses a picture in picture or picture off picture function, to simultaneously watch a channel corresponding to a large picture and a channel corresponding to a small picture. The user, through a remote controller, sends an FCC request of the channel corresponding to the large picture to the set-top box. The set-top box forwards the FCC request to the router. The router processes the FCC request and starts to accelerate pushing a unicast data flow of a switched channel corresponding to the foregoing large picture.

Step 23: In the case that previous FCC is not completed, the foregoing user sends an FCC request of a channel corresponding to a small picture to the set-top box through the remote controller. The set-top box forwards the FCC request to the router. The foregoing router compares rates of two channels corresponding to the foregoing two FCC requests. When finding that the rates of the two channels are not in the same rate range, the foregoing router determines that the user sending the foregoing two FCC requests uses the picture in picture or picture off picture function, and switching of the channel corresponding to the large picture and switching of the channel corresponding to the small picture are performed concurrently. That is, in the case that previous FCC of the channel corresponding to the large picture is not completed, the router receives another FCC request of the channel corresponding to the small picture sent by the same user.

The foregoing router does not stop pushing of the unicast data flow of the switched channel corresponding to the foregoing large picture, and starts to push a unicast data flow for FCC switching of a channel corresponding to a small picture received subsequently.

Step 24: The set-top box sends a notification about ending pushing of the unicast data flow of the switched channel corresponding to the large picture to the router. The router ends pushing of the data flow of the channel corresponding to the large picture of the user and completes corresponding channel change of the large picture. The set-top box sends a notification about ending pushing of the unicast data flow of the switched channel corresponding to the small picture to the router. The router ends pushing of the data flow of the channel corresponding to the small picture of the user and completes corresponding channel change of the small picture. In the embodiment of the present invention, when the FCC server determines that the rates of the plurality of channels corresponding to the plurality of FCC requests do not belong to the same rate range, the FCC server respectively performs channel change processing for the plurality of FCC requests. The embodiment of the present invention may be applied to a scenario in which FCC is concurrently performed for a channel corresponding to a large picture and a channel corresponding to a small picture of the same user. That is, an FCC server receives a new FCC request in the case that previous FCC is not completed. At this time, even if the FCC server receives a new FCC request in the case that previous FCC is not completed, the FCC server does not need to start a stop mechanism to end the previous FCC process. The embodiment of the present invention ensures that FCC of the channel corresponding to the large picture and FCC of the channel corresponding to the small picture of the same user do not interfere with each other.

Embodiment 3

Figure 3:
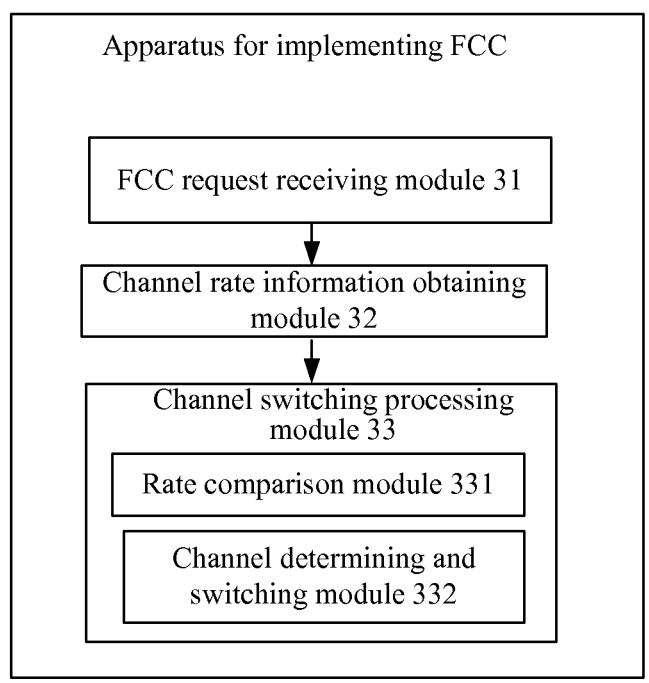
FIG. 3 is a specific structural diagram of an apparatus of implementing FCC according to Embodiment 3 of the present invention.

This embodiment provides an apparatus for implementing FCC. The apparatus is set in an FCC server. FIG. 3 shows a structure of the apparatus. The apparatus for implementing FCC includes an FCC request receiving module 31, a channel rate information obtaining module 32, and a channel change processing module 33.

The FCC request receiving module 31 is configured to receive a plurality of FCC requests concurrently sent by the same user. Concurrently sending FCC requests indicates that an FCC server receives a new FCC request in the case that previous FCC is not completed.

Of course, the FCC request receiving module 31 is also configured to receive FCC requests of different users or FCC requests of the same user.

The channel rate information obtaining module 32 is configured to obtain rate information of a plurality of channels corresponding to the plurality of FCC requests received by the FCC request receiving module 31.

The channel change processing module 33 is configured to: when it is determined that rates of the plurality of channels obtained by the channel rate information obtaining module 32 do not belong to the same rate range, respectively perform channel change processing for the plurality of FCC requests.

The channel change processing module 33 is configured to determine that, when it is determined that the rates of the plurality of channels obtained by the channel rate information obtaining module 32 do not belong to the same rate range, the plurality of FCC requests concurrently sent by the same user are FCC requests respectively corresponding to channels corresponding to a large picture and a small picture of picture in picture or picture off picture, where when the plurality of FCC requests respectively corresponds to channels with different picture sizes watched by the same user, the channel change processing module 33 respectively performs channel change processing for the plurality of FCC requests.

If the rates of the plurality of channels obtained by the channel rate information obtaining module 32 belong to the same rate range, it is determined that the plurality of FCC requests concurrently sent by the same user are not FCC requests respectively corresponding to channels corresponding to a large picture and a small picture of picture in picture or picture off picture, where when the plurality of FCC requests respectively corresponds to channels with the same picture size watched by the same user, the channel switching processing module 33 performs channel change processing for an FCC request received last time and stops processing other FCC requests.

Specifically, the channel rate information obtaining module 32 is further configured to: according to preset configuration information or a self-learning manner, obtain the rates of the plurality of channels corresponding to the plurality of FCC requests.

Specifically, the channel change processing module 33 may include:

a rate comparison module 331, configured to compare the rates of the plurality of channels with a preset channel rate threshold, and determine that the rates of the plurality of channels do not belong to the same rate range; and a channel determining and switching module 332, configured to determine that the same user is using a picture in picture or picture off picture function, and the plurality of FCC requests respectively corresponds to channels with different picture sizes simultaneously watched by the same user, and respectively perform channel change processing for the channels with different picture sizes.

Further, the channel changing processing module 33, further configured to determine that, when it is determined that the rates of the plurality of channels respectively corresponding to the plurality of FCC requests belong to the same rate range, the plurality of FCC requests concurrently sent by the same users are not FCC requests respectively corresponding to channels corresponding to a large picture and a small picture of picture in picture or picture off picture, where when the plurality of FCC requests respectively corresponds to channels with the same picture size watched by the same user, perform channel change processing for an FCC request received last time and stop processing other FCC requests.

The detailed process of performing FCC by using the apparatus in this embodiment of the present invention is similar to that in the preceding method embodiments. The details are not described herein again.

Person of ordinary skill in the art may understand that all or a part of the processes of the method in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Read-Only Memory, RAM).

Based on the above, in the embodiments of the present invention, when the FCC server determines that the rates of the plurality of channels corresponding to the plurality of FCC requests do not belong to the same rate range, the FCC server respectively performs channel change processing for the plurality of FCC requests. The embodiments of the present invention may be applied to a scenario in which FCC is concurrently performed for a channel corresponding to a large picture and a channel corresponding to a small picture of the same user, and ensure that FCC of the channel corresponding to the large picture and FCC of the channel corresponding to the small picture of the same user do not interfere with each other. A user may experience concurrent channel fast switching of large and small pictures.

The embodiments of the present invention, by setting an adjustable channel rate threshold, may support different application scenarios and service applications of FCC switching concurrently performed for a plurality of channels with a plurality of rate ranges. In the embodiments of the present invention, when the FCC server determines that the rates of the plurality of concurrent channels corresponding to the plurality of FCC requests do not belong to the same rate range, the FCC server respectively performs channel change processing for the plurality of FCC requests. The embodiments of the present invention may be applied to a scenario in which FCC is concurrently performed for a channel corresponding to a large picture and a channel corresponding to a small picture of the same user. At this time, even if the FCC server receives a new FCC request in the case that a previous FCC request is not completed, the FCC server does not need to start a stop mechanism to end the previous FCC process. The embodiments of the present invention ensure that FCC of the channel corresponding to the large picture and FCC of the channel corresponding to the small picture of the same user do not interfere with each other.

The foregoing descriptions are merely preferred specific embodiments of the present invention, but are not intended to limit the protection scope of the present invention. Any variation or replacement figured out by persons skilled in the art within the technical scope disclosed in the present invention shall fall within the protection scope of the present invention. Therefore, the protection scope of the present invention shall be subject to the protection scope of the claims.

What is claimed is:

1. A method for implementing fast channel change, comprising:
   receiving, by a fast channel change (FCC) server, a plurality of FCC requests concurrently sent by the same user, and obtaining, by the FCC server, bit rates of a plurality of channels corresponding to the plurality of FCC requests; and
   when the FCC server determines that at least one of the bit rates of the plurality of channels corresponding to the plurality of FCC requests does not belong to a same bit rate range as another of the bit rates of the plurality of channels, respectively performing, by the FCC server, channel change processing for the plurality of FCC requests.

2. The method for implementing fast channel change according to claim 1, wherein the receiving, by the fast channel change FCC server, the plurality of FCC requests concurrently sent by the same user, and obtaining, by the FCC server, the bit rates of the plurality of channels corresponding to the plurality of FCC requests comprises:

after the FCC server receives the plurality of FCC requests, respectively obtaining source Internet Protocol IP addresses of the plurality of FCC requests, and when the source IP addresses of the plurality of FCC requests are the same, determining, by the FCC server, that the plurality of FCC requests are sent by the same user; and according to preset configuration information or a self-learning manner, obtaining, by the FCC server, the bit rates of the plurality of channels corresponding to the plurality of FCC requests.

3. The method for implementing fast channel change according to claim 1, wherein the when the FCC server determines that the at least one of the bit rates of the plurality of channels corresponding to the plurality of FCC requests does not belong to the same bit rate range as the another of the bit rates of the plurality of channels, respectively performing, by the FCC server, channel change processing for the plurality of FCC requests by the FCC server comprises:

comparing, by the FCC server, the bit rates of the plurality of channels with a preset channel bit rate threshold, and determining that the at least one of the bit rates does not belong to the same bit rate range as the another of the bit rates of the plurality of channels, determining, by the FCC server, that the same user is using a picture in picture or picture off picture function, and the plurality of FCC requests respectively corresponds to channels with different picture sizes simultaneously watched by the same user, and respectively performing, by the FCC server, channel change processing for the channels with different picture sizes.

4. The method for implementing fast channel change according to claim 1, further comprising:

when the FCC server determines that the bit rates of the plurality of channels respectively corresponding to the plurality of FCC requests belong to the same bit rate range, determining, by the FCC server, that the plurality of FCC requests respectively corresponds to channels with the same picture size watched by the same user, and performing, by the FCC server, channel change processing for an FCC request received last time and stopping processing other FCC requests.

5. The method for implementing fast channel change according to claim 1, further comprising:

determining that one of the plurality of channels is carrying a main picture program with a large picture and a high definition when a bit rate of the one of the plurality of channels is higher than a preset channel bit rate threshold, and determining that another of the plurality of channels is carrying a sub-picture program with a small picture and a low definition when the bit rate of the one of the plurality of channels is lower than the preset channel bit rate threshold.

6. The method for implementing fast channel change according to claim 1, wherein the bit rate comprises a rate value.

7. The method for implementing fast channel change according to claim 1, wherein the FCC server calculates a bit rate of each of the plurality of channels by recording a number of packets received on each of the plurality of channels per second and a packet length of each of the number of packets.

8. An apparatus for implementing fast channel change FCC, comprising:

an FCC request receiving module, configured to receive a plurality of FCC requests concurrently sent by the same user;

a channel bit rate information obtaining module, configured to obtain bit rate information of a plurality of channels corresponding to the plurality of FCC requests received by the FCC request receiving module; and a channel change processing module, configured to: when it is determined that at least one of the bit rates of the plurality of channels obtained by the channel bit rate information obtaining module does not belong to a same bit rate range as another of the bit rates of the plurality of channels, respectively perform channel change processing for the plurality of FCC requests.

9. The apparatus for implementing FCC according to claim 8, wherein:

the channel bit rate information obtaining module is further configured to: according to preset configuration information or a self-learning manner, obtain the bit rates of the plurality of channels corresponding to the plurality of FCC requests.

10. The apparatus for implementing FCC according to claim 8, wherein the channel change processing module comprises:

a bit rate comparison module, configured to compare the bit rates of the plurality of channels with a preset channel bit rate threshold, and determine that the at least one of the bit rates of the plurality of channels does not belong to the same bit rate range as the another of the bit rates of the plurality of channels; and a channel determining and switching module, configured to determine that the same user is using a picture in picture or picture off picture function, and the plurality of FCC requests respectively corresponds to channels with different picture sizes simultaneously watched by the same user, and respectively perform channel change processing for the channels with different picture sizes.

11. The apparatus for implementing FCC according to claim 10, wherein:

the channel change processing module is further configured to determine that, when it is determined that the bit rates of the plurality of channels respectively corresponding to the plurality of FCC requests belong to the same bit rate range, the plurality of FCC requests respectively corresponds to channels with the same picture size watched by the same user, and perform channel change processing for an FCC request received last time and stop processing other FCC requests.

12. An apparatus comprising:

a fast channel change (FCC) server configured to receive FCC requests concurrently sent by a same user, obtain bit rates of channels corresponding to the FCC requests received, and respectively perform channel change processing for the FCC requests if the bit rates of the channels belong to at least two bit rate ranges.

* * * * *